US012222807B2

(12) United States Patent
Wu et al.

(10) Patent No.: US 12,222,807 B2
(45) Date of Patent: Feb. 11, 2025

(54) CHECK DATA GENERATION METHOD AND APPARATUS, DEVICE, AND STORAGE MEDIUM

(71) Applicant: SUZHOU METABRAIN INTELLIGENT TECHNOLOGY CO., LTD., Jiangsu (CN)

(72) Inventors: Ruizhen Wu, Jiangsu (CN); Jingjing Chen, Jiangsu (CN); Yongxing Zhang, Jiangsu (CN); Lin Wang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/695,491

(22) PCT Filed: Sep. 29, 2022

(86) PCT No.: PCT/CN2022/122787
§ 371 (c)(1),
(2) Date: Mar. 26, 2024

(87) PCT Pub. No.: WO2023/151288
PCT Pub. Date: Aug. 17, 2023

(65) Prior Publication Data
US 2024/0264906 A1  Aug. 8, 2024

(30) Foreign Application Priority Data
Feb. 11, 2022 (CN) .......................... 202210126966.4

(51) Int. Cl.
*G06F 11/00* (2006.01)
*G06F 11/10* (2006.01)
(52) U.S. Cl.
CPC ...... *G06F 11/1076* (2013.01); *G06F 11/1004* (2013.01)

(58) Field of Classification Search
None
See application file for complete search history.

(56) References Cited

U.S. PATENT DOCUMENTS 6,138,125 A    10/2000  Demoss
2012/0260125 A1* 10/2012  Wang .................. G06F 11/1096
                                              714/6.2
(Continued)

FOREIGN PATENT DOCUMENTS

CN    101625652 A    1/2010
CN    103733175 A    4/2014
(Continued)

OTHER PUBLICATIONS

Google Scholar/Patents search—text refined (Year: 2024).*

*Primary Examiner* — Christopher S McCarthy
(74) *Attorney, Agent, or Firm* — IPro, PLLC

(57) ABSTRACT

A method and apparatus for generating checking data, an electronic device and a non-volatile computer-readable storage medium. The method includes: acquiring a store-status matrix corresponding to a redundant array of independent disks; determining non-reference vectors among the magnetic-disk vectors, and performing data-vector-element evenly dividing processing to an initial data region formed by the non-reference vectors, to obtain first and second data regions; performing data-exchange processing to the first and second data regions in the store-status matrix, to obtain a first matrix; determining a plurality of second-order matrixes in the first and second data regions of the first matrix, and performing position-exchange processing to target magnetic-disk elements in the second-order matrixes, to obtain a second matrix; based on the second matrix, performing single-error-correction encoding generating processing, to obtain first checking data; and based on the (Continued)

second matrix, performing double-error-correction encoding generating processing, to obtain second checking data.

19 Claims, 5 Drawing Sheets

(56) References Cited

U.S. PATENT DOCUMENTS

2013/0124776 A1    5/2013   Hallak et al.
2018/0343018 A1*  11/2018   Chen .................... H03M 13/07

FOREIGN PATENT DOCUMENTS

| CN | 112749039 A | 5/2021 |
| CN | 114168087 A | 3/2022 |

* cited by examiner reference data column ↓

$$\begin{bmatrix} a_1 & a_2 & a_3 & p_a & q_a \\ b_1 & b_2 & b_3 & p_b & q_b \\ c_1 & c_2 & c_3 & p_c & q_c \\ d_1 & d_2 & d_3 & p_d & q_d \end{bmatrix} \begin{matrix} \rightarrow \text{group a} \\ \rightarrow \text{group b} \\ \rightarrow \text{group c} \\ \rightarrow \text{group d} \end{matrix}$$

FIG. 3 reference data column $$\begin{bmatrix} a_1 & c_2 & d_3 & p_a & q_a \\ b_1 & d_2 & c_3 & p_b & q_b \\ c_1 & a_2 & b_3 & p_c & q_c \\ d_1 & b_2 & a_3 & p_d & q_d \end{bmatrix}$$

interval 1 (top box around $c_2, d_3, d_2, c_3$); interval 2 (bottom box around $a_2, b_3, b_2, a_3$)

FIG. 4 disk 1   disk 2   disk 3   checking p   checking q $$\begin{bmatrix} a_1 & 1*c_2 & 1*d_3 & p_a & q_a \\ b_1 & 2*d_2 & 4*c_3 & p_b & q_b \\ c_1 & 3*a_2 & 9*b_3 & p_c & q_c \\ d_1 & 4*b_2 & 16*a_3 & p_d & q_d \end{bmatrix}$$

FIG. 5

CHECK DATA GENERATION METHOD AND APPARATUS, DEVICE, AND STORAGE MEDIUM

CROSS REFERENCE TO RELEVANT APPLICATIONS

The present application claims the priority of the Chinese patent application filed on Feb. 11, 2022 before the Chinese Patent Office with the application number of 202210126966.4 and the title of "CHECK DATA GENERATION METHOD AND APPARATUS, DEVICE, AND STORAGE MEDIUM", which is incorporated herein in its entirety by reference.

TECHNICAL FIELD

The present application relates to the technical field of disk arrays, and particularly relates to a method for generating checking data, an apparatus for generating checking data, an electronic device and a non-volatile computer-readable storage medium.

BACKGROUND

RAID (Redundant Arrays of Independent Disks) refers to a disk array having the capacity of redundancy. The disk array refers to a disk pack having a tremendous capacity obtained by combining a plurality of independent magnetic disks together. The RAID storage technique can greatly increase the storage capacity, improve the capacity of processing the inputting and outputting requests of the system, and, by using the data distributed-storage technique, the concurrent access means and the information redundancy technique, improve the data reliability. RAID 6 is a structure having two parity-check-code independent magnetic disks for distributed storage, and it can perform data recovery when the two magnetic disks simultaneously have a data error, which further improves the data reliability of the disk array. However, when RAID 6 is compatible downwardly with a scene in which only one of the magnetic disks has a data error, the data recovery merely requires one type of the check codes, and this type of the check code is required to be fully used, whereby the storage disk corresponding to that check code has a very high IO throughput data volume, thereby resulting in a low speed of the data recovery.

SUMMARY

In view of the above, an object of the present application is to provide a method for generating checking data, an apparatus for generating checking data, an electronic device and a non-volatile computer-readable storage medium, to increase the speed and the efficiency of data recovery.

In order to solve the above technical problem, the present application provides a method for generating checking data, wherein the method comprises:
  acquiring a store-status matrix corresponding to a redundant array of independent disks, wherein the store-status matrix comprises a plurality of magnetic-disk vectors and a plurality of data vectors, and the magnetic-disk vectors and the data vectors are orthogonal;
  determining non-reference vectors among the magnetic-disk vectors, and performing data-vector-element evenly dividing processing to an initial data region formed by the non-reference vectors, to obtain a first data region and a second data region;
  performing data-exchange processing to the first data region and the second data region in the store-status matrix, to obtain a first matrix;
  determining a plurality of second-order matrixes in the first data region and the second data region of the first matrix, and performing position-exchange processing to target magnetic-disk elements in the second-order matrixes, to obtain a second matrix;
  performing single-error-correction encoding generating processing based on the second matrix, to obtain first checking data, and saving the first checking data into a first checking magnetic disk; and
  performing double-error-correction encoding generating processing based on the second matrix, to obtain second checking data, and saving the second checking data into a second checking magnetic disk.

According to some embodiments, the step of acquiring the store-status matrix corresponding to the redundant array of independent disks comprises:
  acquiring a magnetic-disk quantity, a magnetic-disk capacity and a stripe capacity of the redundant array of independent disks;
  determining a column quantity of the store-status matrix according to the magnetic-disk quantity, and determining a row quantity of the store-status matrix according to the magnetic-disk capacity and the stripe capacity, wherein the row quantity is an even number; and
  based on the column quantity and the row quantity, and a correspondence relation of data storage positions of magnetic disks, generating the store-status matrix.

According to some embodiments, the step of, based on the column quantity and the row quantity, and the correspondence relation of the data storage positions of the magnetic disks, generating the store-status matrix comprises:
  acquiring stripe-identifier data corresponding to data stripes in the magnetic disks;
  according to a relative position relation of the data stripes in the magnetic disks, generating the magnetic-disk vectors corresponding to the magnetic disks; and
  generating an initial matrix based on the column quantity and the row quantity, and filling the initial matrix with the magnetic-disk vectors, to obtain the store-status matrix.

According to some embodiments, the step of determining the plurality of second-order matrixes in the first data region and the second data region of the first matrix comprises:
  determining whether the initial data region in the first matrix has the magnetic-disk vectors of an even-number quantity;
  if it has the magnetic-disk vectors of an even-number quantity, by using two instances of the magnetic-disk vectors as a granularity, dividing the initial data region, to obtain a plurality of third data regions; or
  if it has the magnetic-disk vectors of an odd-number quantity, determining one target magnetic-disk vector, and by using two instances of the magnetic-disk vectors as a granularity, grouping non-target magnetic-disk vectors, to obtain a plurality of third data regions;
  determining whether the initial data region in the first matrix has the data vectors of an even-number quantity; and
  if it has the data vectors of an even-number quantity, by using two instances of the data vectors as a granularity, dividing the third data regions, to obtain the plurality of second-order matrixes; or
  if it has the data vectors of an odd-number quantity, determining one target data vector, and by using two instances of the data vectors as a granularity, dividing non-target data vectors, to obtain the plurality of second-order matrixes.

According to some embodiments, the second matrix comprises a plurality of data vectors, and the data vectors include a current data vector; and the step of, performing single-error-correction encoding generating processing based on the second matrix, to obtain the first checking data comprises:

based on the current data vector, reading a corresponding current data stripe from the redundant array of independent disks, and performing exclusive-or processing to the current data stripe, to obtain the first checking data corresponding to the current data vector.

According to some embodiments, the second matrix comprises a plurality of data vectors, and the data vectors include a current data vector; and the step of, performing double-error-correction encoding generating processing based on the second matrix, to obtain the second checking data comprises:

based on the current data vector, reading a corresponding current data stripe from the redundant array of independent disks;

acquiring a vector serial number corresponding to the current data vector, and by using the vector serial number, generating weight parameters corresponding to the current data stripe; and by using the weight parameters and the data stripes, obtaining weighted data, and performing exclusive-or processing to the weighted data, to obtain the second checking data corresponding to the current data vector.

According to some embodiments, the method further comprises:

if a failure of a target magnetic disk is detected, acquiring error-recovery data from non-target magnetic disks in the redundant array of independent disks;

acquiring target first checking data from the first checking magnetic disk, and acquiring target second checking data from the second checking magnetic disk; and by using the error-recovery data, the target first checking data and the target second checking data, performing data recovery to the target magnetic disk.

The present application further provides an apparatus for generating checking data, wherein the apparatus comprises:

a status generating module configured for acquiring a store-status matrix corresponding to a redundant array of independent disks, wherein the store-status matrix comprises a plurality of magnetic-disk vectors and a plurality of data vectors, and the magnetic-disk vectors and the data vectors are orthogonal;

a data partitioning module configured for determining non-reference vectors among the magnetic-disk vectors, and performing data-vector-element evenly dividing processing to an initial data region formed by the non-reference vectors, to obtain a first data region and a second data region;

a position exchanging module configured for performing data-exchange processing to the first data region and the second data region in the store-status matrix, to obtain a first matrix;

an element exchanging module configured for determining a plurality of second-order matrixes in the first data region and the second data region of the first matrix, and performing position-exchange processing to target magnetic-disk elements in the second-order matrixes, to obtain a second matrix;

a first generating module configured for, based on the second matrix, performing single-error-correction encoding generating processing, to obtain first checking data; and a second generating module configured for, based on the second matrix, performing double-error-correction encoding generating processing, to obtain second checking data.

The present application further provides an electronic device, wherein the electronic device comprises a memory and a processor;

the memory is configured to save a computer program; and the processor is configured to execute the computer program to implement the method for generating checking data stated above.

The present application further provides a non-volatile computer-readable storage medium, wherein the non-volatile computer-readable storage medium is configured to save a computer program, and the computer program, when executed by a processor, implements the method for generating checking data stated above.

The method for generating checking data according to the present application comprises acquiring a store-status matrix corresponding to a redundant array of independent disks, wherein the store-status matrix comprises a plurality of magnetic-disk vectors and a plurality of data vectors, and the magnetic-disk vectors and the data vectors are orthogonal; determining non-reference vectors among the magnetic-disk vectors, and performing data-vector-element evenly dividing processing to an initial data region formed by the non-reference vectors, to obtain a first data region and a second data region; performing data-exchange processing to the first data region and the second data region in the store-status matrix, to obtain a first matrix; determining a plurality of second-order matrixes in the first data region and the second data region of the first matrix, and performing position-exchange processing to target magnetic-disk elements in the second-order matrixes, to obtain a second matrix; based on the second matrix, performing single-error-correction encoding generating processing, to obtain first checking data; and based on the second matrix, performing double-error-correction encoding generating processing, to obtain second checking data.

It can be seen that, in the method, before the checking data are generated, the relation of the checking data and the data stripes in the redundant array of independent disks is rescheduled. The store-status matrix records the storage relation of the data stripes in the redundant array of independent disks in the magnetic disks, and by the position exchanging between the first data region and the second data region and the position exchanging of the target magnetic-disk elements in the second-order matrixes, the correspondence relation of the first checking data and the second checking data with the data stripes is remapped. The obtained first checking data and second checking data, in data recovery, can simultaneously participate in the data recovery, and are not required to all participate in the data recovery, and therefore the data reading amount can be evenly divided into the reading on the first checking data and the reading on the second checking data. The two types of checking data are usually stored in two magnetic disks, and can be read parallelly, which can reduce the duration required by the data reading, to increase the speed and the efficiency of the data recovery.

Additionally, the present application further provides an apparatus for generating checking data, an electronic device and a non-volatile computer-readable storage medium, which also have the above advantageous effect.

BRIEF DESCRIPTION OF THE DRAWINGS

In order to more clearly illustrate the technical solutions of the embodiments of the present application or the related art, the figures that are required to describe the embodiments or the related art will be briefly described below. Apparently, the figures that are described below are merely embodiments of the present application, and a person skilled in the art can obtain other figures according to the provided figures without paying creative work.

FIG. 3 is a schematic diagram of a particular determination on a reference vector according to an embodiment of the present application;

FIG. 4 is a schematic diagram of a particular second matrix according to an embodiment of the present application;

FIG. 5 is a schematic diagram of a particular double-error-correction encoding according to an embodiment of the present application;

DETAILED DESCRIPTION

In order to make the objects, the technical solutions and the advantages of the embodiments of the present application clearer, the technical solutions according to the embodiments of the present application will be clearly and completely described below with reference to the drawings according to the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

Figures 1, 2:
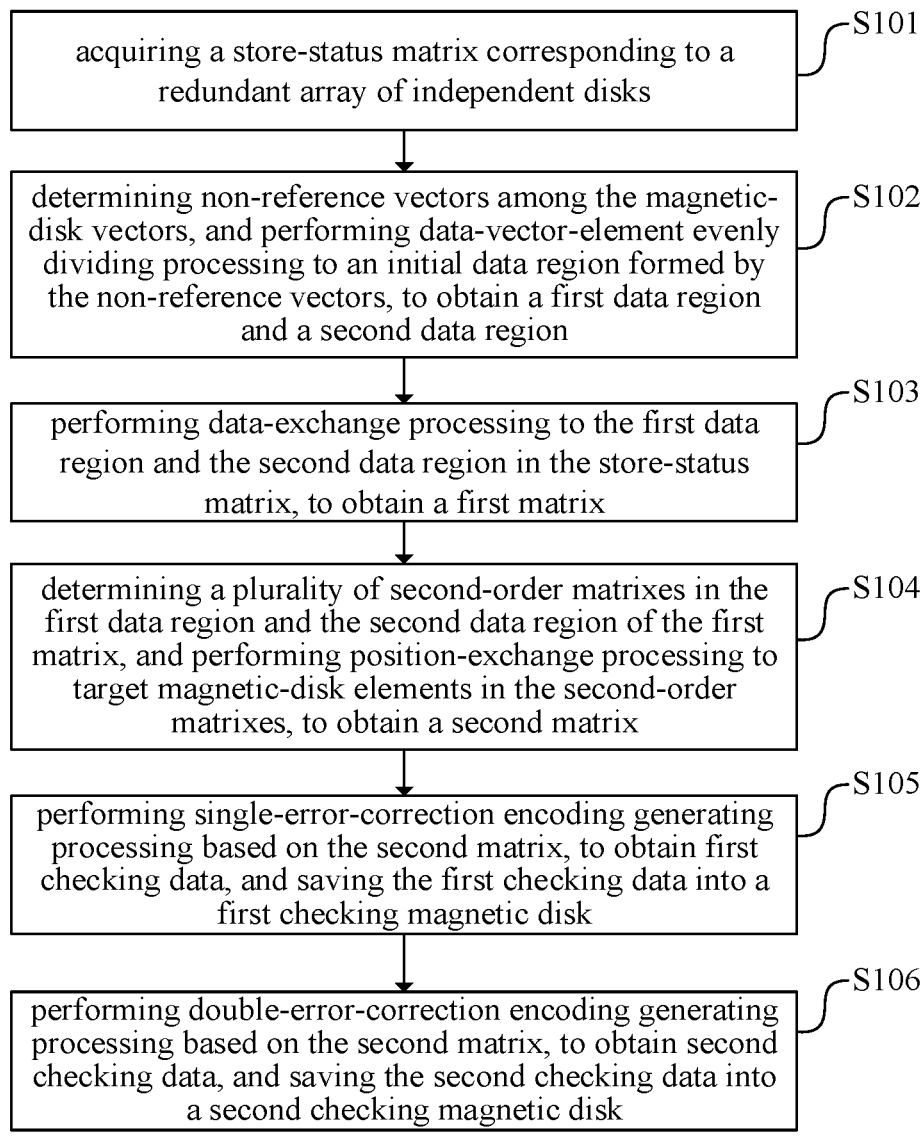
FIG. 1 is a flow chart of a method for generating checking data according to an embodiment of the present application.
FIG. 2 is a schematic diagram of a particular store-status matrix according to an embodiment of the present application.

Referring to FIG. 1, FIG. 1 is a flow chart of a method for generating checking data according to an embodiment of the present application. The method comprises:

S101: acquiring a store-status matrix corresponding to a redundant array of independent disks.

The store-status matrix comprises a plurality of magnetic-disk vectors and a plurality of data vectors, and the magnetic-disk vectors and the data vectors are orthogonal. The redundant array of independent disks comprises a plurality of magnetic disks, and each of the magnetic disks stores a plurality of data blocks, which may include valid data blocks and blank data blocks. The magnetic-disk vectors are used to represent the vectors of the data blocks of one magnetic disk. The data vectors are used to represent the vectors that are at the same storage positions or have the same unique identification data in the magnetic disks. Referring to FIG. 2, FIG. 2 is a schematic diagram of a particular store-status matrix according to an embodiment of the present application. The three column vectors of the disk 1, the disk 2 and the disk 3 form a store-status matrix, wherein $a_{1,1}$ represents the data block stored at the number 1 storage position in the disk 1, $a_{2,1}$ represents the data block stored at the number 1 storage position in the disk 2, and the rest may be done in the same manner. It can be understood that the data blocks corresponding to the elements $a_{x,y}$ may particularly be valid data blocks that have been saved, or may be blank data blocks where any valid datum is not written in. Therefore, it can be determined that the data vectors in FIG. 2 are the row vectors, and the magnetic-disk vectors are the column vectors. The particular contents of the elements in the store-status matrix, for example, the elements $a_{x,y}$ in FIG. 2, are not limited, and it is merely required that they can uniquely represent one data block. For example, they may be the unique identification data of the data blocks, and the form of the unique identification data may be configured according to demands. For example, as shown in FIG. 2, one data block is identified uniquely by means of (the magnetic-disk serial number, the serial number of the data block in the magnetic disk). Additionally, it can be understood that it is merely required that the magnetic-disk vectors and the data vectors maintain intersecting, and both of them may be the row vectors or the column vectors.

It should be noted that the quantity of the magnetic disks in the redundant array of independent disks is not limited. However, the data blocks that each of the magnetic disks can store have equal quantities and sizes, and the quantity of the data blocks that a single magnetic disk stores should be an even-number quantity, to ensure that the subsequent checking data can be correctly generated.

The particular mode of acquiring the store-status matrix is not limited in the present embodiment. For example, the electronic device that implements the steps according to the present application (which may be referred to as the implementation subject device) may acquire the store-status matrix from another electronic device. Alternatively, the implementation subject device may generate the store-status matrix directly according to the state of the RAID corresponding to it. For example, in an embodiment, this step may comprise acquiring a magnetic-disk quantity, a magnetic-disk capacity and a stripe capacity of the redundant array of independent disks, wherein the stripe capacity refers to the size of one data block. It should be noted that the quantity of the data stripes (i.e., the data blocks) of a single magnetic disk should be an even-number. Therefore, this step may comprise, by using the magnetic-disk quantity, determining the column quantity of the store-status matrix, and by using the magnetic-disk capacity and the stripe capacity, determining the row quantity of the store-status matrix, wherein the row quantity is an even number; and based on the obtained column quantity and row quantity, and the correspondence relation of the data storage positions of the magnetic disks, generating the store-status matrix. The correspondence relation of the data storage positions refers to the correspondence relation of the storage positions in the magnetic disk of the data blocks of the magnetic disk.

Particularly, in an embodiment, this step may comprise acquiring the stripe-identifier data corresponding to the data stripes (i.e., the data blocks) in the magnetic disks, for example, the identifier data of all in FIG. 2; according to the relative position relation of the data stripes in the magnetic disks, generating the magnetic-disk vectors corresponding to the magnetic disks, wherein the relative position relation is exactly the above-described correspondence relation of the data storage positions; and based on the column quantity and the row quantity, generating an initial matrix, wherein the initial matrix refers to a blank matrix not filled with the elements, and filling the initial matrix with the magnetic-disk vectors, whereby the store-status matrix can be obtained.

S102: determining non-reference vectors among the magnetic-disk vectors, and performing data-vector-element evenly dividing processing to an initial data region formed by the non-reference vectors, to obtain a first data region and a second data region.

After the store-status matrix has been obtained, one of the plurality of magnetic-disk vectors therein is determined to be the reference vector, and the other are determined to be the non-reference vectors. As an example, referring to FIG. 3, FIG. 3 is a schematic diagram of a particular determination on a reference vector according to an embodiment of the present application. In the store-status matrix in FIG. 2, the magnetic-disk vector corresponding to the disk 1 is determined to be the reference vector. After the non-reference vectors have been determined, the region where the non-reference vectors are located is determined to be the initial data region, the elements of the data vectors in the initial data region are evenly divided into two parts, and the regions where the two parts of the elements obtained after the equal dividing are located are determined to be the first data region and the second data region.

Particularly, referring to FIG. 3, the data vectors may be labeled as the group a, the group b, the group c and the group d, and the magnetic-disk vectors that $a_2$ and $a_3$ belong to are the non-reference vectors. Therefore, the elements in the initial data region include $a_2$, $b_2$, $c_2$, $d_2$, $a_3$, $b_3$, $c_3$ and $d_3$. The data-vector-element evenly dividing processing refers to evenly dividing the elements in the direction of the data vectors (i.e., the horizontal direction). Taking FIG. 3 as an example, the elements of the group a and the group b in the initial data region may be allocated into the first data region, and the group c and the group d in the initial data region may be allocated into the second data region. It can be understood that the dividing may also be by means of the group a/the group c, and the group b/the group d, or the dividing may also be by means of the group a/the group d, and the group b/the group c.

S103: performing data-exchange processing to the first data region and the second data region in the store-status matrix, to obtain a first matrix.

After the first data region and the second data region have been determined, the elements in the two data regions are exchanged, i.e., data-exchange processing, whereby the first matrix can be obtained. It should be noted that, after the data exchanging, the relative position relation of the elements in the first data region and the second data region does not change. For example, the data that are originally located at the first row of the first data region, after exchanged to the second data region, are still located at the first row of the second data region.

S104: determining a plurality of second-order matrixes in the first data region and the second data region of the first matrix, and performing position-exchange processing to target magnetic-disk elements in the second-order matrixes, to obtain a second matrix.

The second-order matrix refers to a data set formed by totally four elements in two rows and two columns, wherein the four elements definitely belong to two magnetic-disk vectors and two data vectors. After the first matrix has been obtained, a plurality of second-order matrixes are determined in the first data region and the second data region individually. The particular mode of determining the second-order matrixes is not limited. For example, it may comprise selecting the second-order matrixes sequentially in the order of the neighboring vectors. Alternatively, it may comprise randomly selecting two magnetic-disk vectors and two data vectors, and determining the four elements at their intersection positions as belonging to the same second-order matrix. After the second-order matrixes have been determined, regarding each of the second-order matrixes, each of the elements therein belongs to two magnetic-disk vectors. Any two elements that belong to the same magnetic-disk vector may be determined to be the target magnetic-disk elements, and their positions are exchanged. All of the second-order matrixes undergo the above processing, to obtain a second matrix.

As an example, referring to FIG. 4, FIG. 4 is a schematic diagram of a particular second matrix according to an embodiment of the present application. After the data exchange between the interval 1 (i.e., the first data region) and the interval 2 (i.e., the second data region), each of the data regions forms one second-order matrix. By determining the elements of the magnetic-disk vectors that belong to the disk 3 in the second-order matrixes to be the target magnetic-disk elements, and exchanging them, the second matrix shown in FIG. 4 can be obtained. It can be understood that, after the exchanging, the two elements in the second-order matrixes that originally belong to the different data vectors are reallocated into one data vector.

It can be understood that, because the second-order matrixes are determined in the first data region and the second data region individually, there might be cases in which the row quantity and/or the column quantity of a certain data region is an odd number. In this case the second matrix can also be generated, whereby the method according to the present application can be applied in more extensive areas. Particularly, this step may comprise, firstly, determining whether the initial data region in the first matrix has the magnetic-disk vectors of an even-number quantity; and if it has the magnetic-disk vectors of an even-number quantity, by using two magnetic-disk vectors as the granularity, dividing the initial data region, to obtain a plurality of third data regions, wherein it should be noted that the two magnetic-disk vectors in the grouping according to the present application may be adjacent or not adjacent; or if it has the magnetic-disk vectors of an odd-number quantity, determining one target magnetic-disk vector, and by using two magnetic-disk vectors as the granularity, grouping non-target magnetic-disk vectors, to obtain a plurality of third data regions. After the dividing of the third data regions has been completed, this step may comprise determining whether the initial data region in the first matrix has the data vectors of an even-number quantity; and if it has the data vectors of an even-number quantity, by using two data vectors as the granularity, dividing the third data regions, to obtain the plurality of second-order matrixes; or if it has the data vectors of an odd-number quantity, determining one target data vector, and by using two data vectors as the granularity, dividing non-target data vectors, to obtain the plurality of second-order matrixes.

It can be understood that, after the above-described processing, a plurality of second-order matrixes can also be determined, except that it might be the case that all of the magnetic-disk vectors and/or the data vectors cannot be allocated into a certain second-order matrix. Regarding the data block corresponding to that magnetic-disk vector and/or data vector, when it is required to undergo data recovery, it may be recovered by using a conventional RAID 6 algorithm. Regarding the data blocks corresponding to the elements that have been allocated into a certain second-order matrix, when they are required to undergo data recovery, merely part of the first checking data and the second checking data that are subsequently generated may be read, to reduce the duration of the data reading, and increase the speed of the data recovery.

S105: based on the second matrix, performing single-error-correction encoding generating processing, to obtain first checking data, and saving the first checking data into a first checking magnetic disk.

After the second matrix has been obtained, single-error-correction encoding generating processing is performed to it. The particular mode of the single-error-correction encoding generating processing is not limited, and may refer to the related art. For example, in an embodiment, the second matrix comprises a plurality of data vectors, and the data vectors include a current data vector. For the calculation on the first checking data, this step may comprise, based on the current data vector, reading a corresponding current data stripe from the redundant array of independent disks, and performing exclusive-or processing to the current data stripe, to obtain the first checking data corresponding to the current data vector. Particularly, taking FIG. 4 as an example, $P_a$, $P_b$, $P_c$ and $P_d$ are the first checking data. The employed mode of generating the single-error-correction encoding is the encoding mode of RAID 5. Because the correspondence relation between the data blocks has changed, the new encoding relation is:

$$p = \begin{cases} p_a = a_1 \oplus c_2 \oplus d_3 \\ p_b = b_1 \oplus d_2 \oplus c_3 \\ p_c = c_1 \oplus a_2 \oplus b_3 \\ p_d = d_1 \oplus b_2 \oplus a_3 \end{cases}$$

S106: based on the second matrix, performing double-error-correction encoding generating processing, to obtain second checking data, and saving the second checking data into a second checking magnetic disk.

The double-error-correction encoding generating processing refers to a processing that uses a double-error-correction encoding algorithm to realize multi-data-block error-correction operation. The double-error-correction encoding algorithm may particularly be the algorithms such as Cauchy and Vandermonde. Taking the Vandermonde algorithm as an example, the second matrix comprises a plurality of data vectors, and the data vectors include a current data vector. For the calculation on the second checking disk, this step comprises based on the current data vector, reading a corresponding current data stripe from the redundant array of independent disks; acquiring a vector serial number corresponding to the current data vector, and by using the vector serial number, generating weight parameters corresponding to the current data stripe; and by using the weight parameters and the data stripes, obtaining weighted data, and performing exclusive-or processing to the weighted data, to obtain the second checking data corresponding to the current data vector. Particularly, based on FIG. 4, $q_a$, $q_b$, $q_c$ and $q_d$ in FIG. 4 are the second checking data. Regarding the element correspondence relation in FIG. 4, encoding parameters are introduced, and the result is shown in FIG. 5. FIG. 5 is a schematic diagram of a particular double-error-correction encoding according to an embodiment of the present application. In the matrix shown in FIG. 5, because the submatrix formed by the three column vectors of the disk 1, the disk 2 and the disk 3 satisfies the Vandermonde characteristic, it must be full rank. Therefore, any of its submatrixes, as can be known according to the Vandermonde characteristic, must also be a full-rank matrix. Therefore, that indicates that the matrix in FIG. 5 must be a soluble inverse matrix, and therefore the process of calculating the second checking data is:

$$q = \begin{cases} q_a = a_1 \oplus 3a_2 \oplus 16a_3 \\ q_b = b_1 \oplus 4b_2 \oplus 9b_3 \\ q_c = c_1 \oplus c_2 \oplus 4c_3 \\ q_d = d_1 \oplus 2d_2 \oplus d_3 \end{cases}$$

It can be known that the encoding relation matrix in the above formula is obtained based on matrix transformation of the Vandermonde matrix, and satisfies the characteristic of a Vandermonde matrix, and therefore it is full rank and must be reversible. It can be determined that, if any one or two magnetic disks have an error, the Vandermonde characteristic still exists, and therefore the data blocks therein can be recovered.

Figure 6:
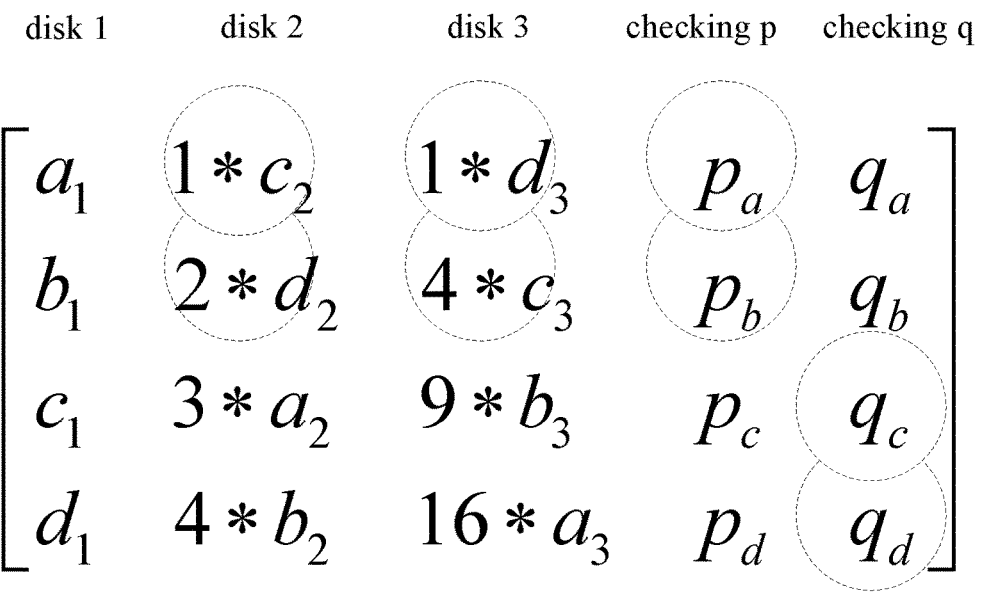
FIG. 6 is a schematic diagram of a particular data recovery according to an embodiment of the present application.

According to some embodiments, after the first checking data and the second checking data have been obtained, and have been saved into the first checking magnetic disk and the second checking magnetic disk respectively, if a certain magnetic disk malfunctions, for example, if a failure of a target magnetic disk is detected, and it is required to recover the data therein, the method may comprise acquiring error-recovery data from non-target magnetic disks in the redundant array of independent disks; acquiring target first checking data from the first checking magnetic disk, and acquiring target second checking data from the second checking magnetic disk, wherein it should be noted that the first checking data and the second checking data usually correspond to different data vectors, and the first checking data or the second checking data correspond to the data vectors the same as the data vectors corresponding to the error-recovery data; and by using the error-recovery data, the target first checking data and the target second checking data, performing data recovery to the target magnetic disk. Particularly, referring to FIG. 6, FIG. 6 is a schematic diagram of a particular data recovery according to an embodiment of the present application. If the disk 1 malfunctions, then the data encircled by the dotted-line circle can be read from the disk 2, the disk 3, the checking disk p (i.e., the first checking magnetic disk) and the checking disk q (i.e., the second checking magnetic disk). In the recovery, $a_1$ and $b_1$ can be recovered by using $c_2/d_3/p_a$ and $d_2/c_3/p_b$ respectively. $C_1$ and $d_1$ can be recovered by using $c_2/d_3/q_c$ and $d_2/c_3/q_d$ respectively. In this case, regarding each of the disk 2, the disk 3, the first checking magnetic disk and the second checking magnetic disk, the read data blocks are two. As compared with the data recovery in the conventional RAID 6, in which it is required to read four data blocks in each of the disk 2, the disk 3 and the checking disk p, the single-error-correction recovery can reduce a half of the data reading amount of each of the disks, which obviously reduces the duration required by the data reading.

Regarding the scenes of double error correction, the first checking data and the second checking data that are calculated according to the present application are also applicable. Particularly, if the data of the disk 1 and the disk 2 are lost, and require memory recovery, then firstly the surviving data of the disk 3 may be used to wipe the same data in the checking disk p and the checking disk q, to obtain the remaining data relation, and a matrix A may be constructed:

$$A = \begin{bmatrix} 1 & 0 & 0 & 0 & 1 & 0 & 0 & 0 \\ 1 & 0 & 3 & 0 & 0 & 0 & 0 & 0 \\ 0 & 1 & 0 & 0 & 0 & 1 & 0 & 0 \\ 0 & 1 & 0 & 4 & 0 & 0 & 0 & 0 \\ 0 & 0 & 1 & 0 & 0 & 0 & 1 & 0 \\ 0 & 0 & 1 & 0 & 1 & 0 & 0 & 0 \\ 0 & 0 & 0 & 1 & 0 & 0 & 0 & 1 \\ 0 & 0 & 0 & 1 & 0 & 2 & 0 & 0 \end{bmatrix} * \begin{bmatrix} a_1 \\ b_1 \\ c_1 \\ d_1 \\ a_2 \\ b_2 \\ c_2 \\ d_2 \end{bmatrix} = \begin{bmatrix} p_a \oplus d_3 \\ q_a \oplus 16a_3 \\ p_b \oplus c_3 \\ q_b \oplus 9b_3 \\ p_c \oplus b_3 \\ q_c \oplus 4c_3 \\ p_d \oplus a_3 \\ q_d \oplus d_3 \end{bmatrix}$$

In this case, the recovering mode and the deletion rectifying method are similar. By solving the rank of the matrix A, it can be obtained that rank (A)=8, and it can be determined that the matrix is reversible. Therefore, by using the inverse matrix relation of the matrix, the values of $a_1$, $b_1$, $c_1$, $d_1$, $a_2$, $b_2$, $c_2$ and $d_2$ can be solved, to realize the data recovery.

By using the method for generating checking data according to the embodiments of the present application, before the checking data are generated, the relation of the checking data and the data stripes in the redundant array of independent disks is rescheduled. The store-status matrix records the storage relation of the data stripes in the redundant array of independent disks in the magnetic disks, and by the position exchanging between the first data region and the second data region and the position exchanging of the target magnetic-disk elements in the second-order matrixes, the correspondence relation of the first checking data and the second checking data with the data stripes is remapped. The obtained first checking data and second checking data, in data recovery, can simultaneously participate in the data recovery, and are not required to all participate in the data recovery, and therefore the data reading amount can be evenly divided into the reading on the first checking data and the reading on the second checking data. The two types of checking data are usually stored in two magnetic disks, and can be read parallelly, which can reduce the duration required by the data reading, to increase the speed and the efficiency of the data recovery.

An apparatus for generating checking data according to the embodiments of the present application will be described below, and the apparatus for generating checking data described below and the method for generating checking data described above may correspondingly refer to each other.

Figure 7:
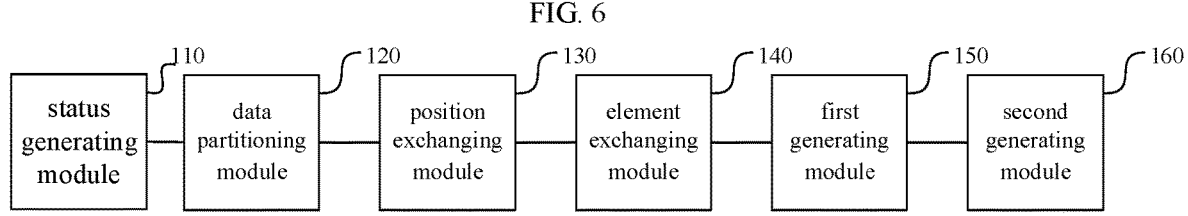
FIG. 7 is a schematic structural diagram of an apparatus for generating checking data according to an embodiment of the present application.

Referring to FIG. 7, FIG. 7 is a schematic structural diagram of an apparatus for generating checking data according to an embodiment of the present application. The apparatus comprises:

a status generating module 110 configured for acquiring a store-status matrix corresponding to a redundant array of independent disks, wherein the store-status matrix comprises a plurality of magnetic-disk vectors and a plurality of data vectors, and the magnetic-disk vectors and the data vectors are orthogonal;

a data partitioning module 120 configured for determining non-reference vectors among the magnetic-disk vectors, and performing data-vector-element evenly dividing processing to an initial data region formed by the non-reference vectors, to obtain a first data region and a second data region;

a position exchanging module 130 configured for performing data-exchange processing to the first data region and the second data region in the store-status matrix, to obtain a first matrix;

an element exchanging module 140 configured for determining a plurality of second-order matrixes in the first data region and the second data region of the first matrix, and performing position-exchange processing to target magnetic-disk elements in the second-order matrixes, to obtain a second matrix;

a first generating module 150 configured for, based on the second matrix, performing single-error-correction encoding generating processing, to obtain first checking data; and a second generating module 160 configured for, based on the second matrix, performing double-error-correction encoding generating processing, to obtain second checking data.

According to some embodiments, the status generating module 110 comprises:

an acquiring unit configured for acquiring a magnetic-disk quantity, a magnetic-disk capacity and a stripe capacity of the redundant array of independent disks;

a calculating unit configured for, by using the magnetic-disk quantity, determining a column quantity of the store-status matrix, and by using the magnetic-disk capacity and the stripe capacity, determining a row quantity of the store-status matrix, wherein the row quantity is an even number; and a generating unit configured for, based on the column quantity and the row quantity, and a correspondence relation of data storage positions of magnetic disks, generating the store-status matrix.

According to some embodiments, the generating unit comprises:

an identifier acquiring unit configured for acquiring stripe-identifier data corresponding to data stripes in the magnetic disks;

a magnetic-disk-vector generating unit configured for, according to a relative position relation of the data stripes in the magnetic disks, generating the magnetic-disk vectors corresponding to the magnetic disks; and a filling unit configured for, based on the column quantity and the row quantity, generating an initial matrix, and filling the initial matrix with the magnetic-disk vectors, to obtain the store-status matrix.

According to some embodiments, the element exchanging module 140 comprises:

a first determining unit configured for determining whether the initial data region in the first matrix has the magnetic-disk vectors of an even-number quantity;

a first dividing unit configured for, if it has the magnetic-disk vectors of an even-number quantity, by using two instances of the magnetic-disk vectors as a granularity, dividing the initial data region, to obtain a plurality of third data regions;

a second dividing unit configured for, if it has the magnetic-disk vectors of an odd-number quantity, determining one target magnetic-disk vector, and by using two instances of the magnetic-disk vectors as a granularity, grouping non-target magnetic-disk vectors, to obtain a plurality of third data regions;

a second determining unit configured for determining whether the initial data region in the first matrix has the data vectors of an even-number quantity;

a third dividing unit configured for, if it has the data vectors of an even-number quantity, by using two instances of the data vectors as a granularity, dividing the third data regions, to obtain the plurality of second-order matrixes; and a fourth dividing unit configured for, if it has the data vectors of an odd-number quantity, determining one target data vector, and by using two instances of the data vectors as a granularity, dividing non-target data vectors, to obtain the plurality of second-order matrixes.

According to some embodiments, the second matrix comprises a plurality of data vectors, and the data vectors include a current data vector; and the first generating module 150 comprises:

an exclusive-or calculating unit configured for, based on the current data vector, reading a corresponding current data stripe from the redundant array of independent disks, and performing exclusive-or processing to the current data stripe, to obtain the first checking data corresponding to the current data vector.

According to some embodiments, the second matrix comprises a plurality of data vectors, and the data vectors include a current data vector; and the second generating module 160 comprises:

a reading unit configured for, based on the current data vector, reading a corresponding current data stripe from the redundant array of independent disks;

a weight generating unit configured for acquiring a vector serial number corresponding to the current data vector, and by using the vector serial number, generating weight parameters corresponding to the current data stripe; and a weight exclusive-or unit configured for, by using the weight parameters and the data stripes, obtaining weighted data, and performing exclusive-or processing to the weighted data, to obtain the second checking data corresponding to the current data vector.

According to some embodiments, the apparatus further comprises:

a first reading module configured for, if a failure of a target magnetic disk is detected, acquiring error-recovery data from non-target magnetic disks in the redundant array of independent disks;

a second reading module configured for acquiring target first checking data from a first checking magnetic disk, and acquiring target second checking data from a second checking magnetic disk; and a recovering module configured for, by using the error-recovery data, the target first checking data and the target second checking data, performing data recovery to the target magnetic disk.

An electronic device according to the embodiments of the present application will be described below, and the electronic device described below and the method for generating checking data described above may correspondingly refer to each other.

Figure 8:
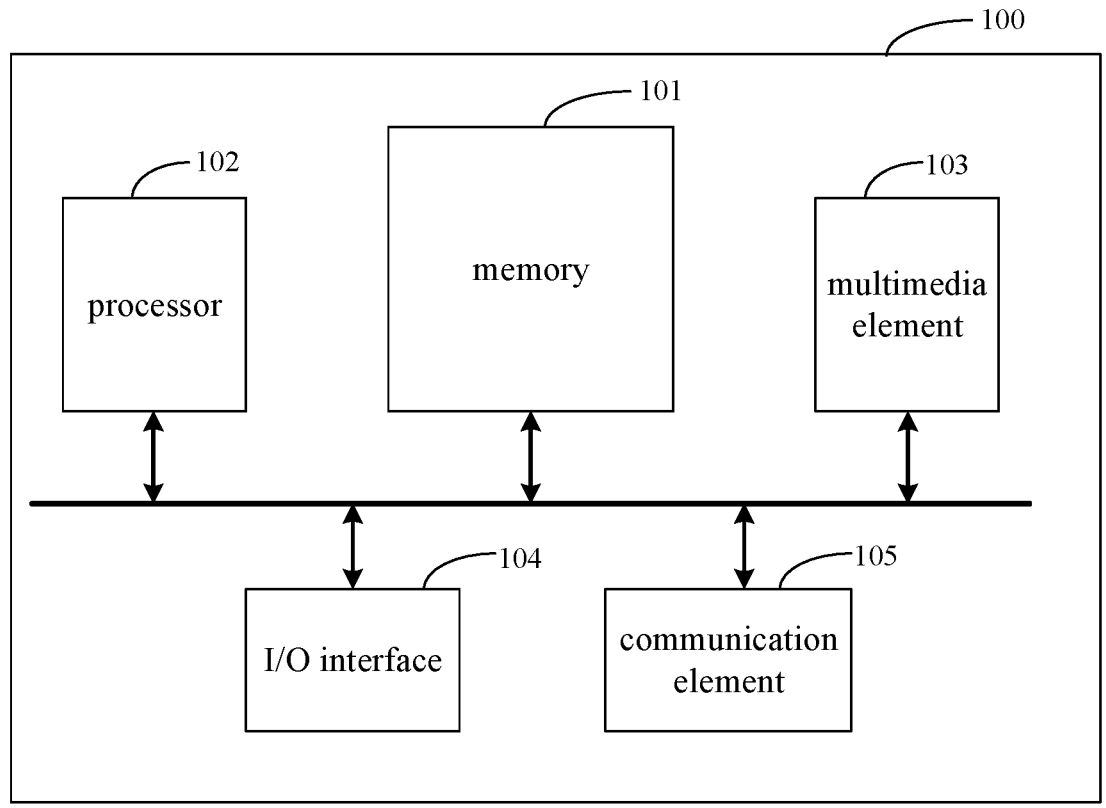
FIG. 8 is a schematic structural diagram of an electronic device according to an embodiment of the present application.

Referring to FIG. 8, FIG. 8 is a schematic structural diagram of an electronic device according to an embodiment of the present application. The electronic device 100 may comprise a processor 101 and a memory 102. The electronic device 100 may further comprise one or more of a multimedia element 103, an information input/information output (I/O) interface 104 and a communication element 105.

The processor 101 is configured for controlling the overall operations of the electronic device 100, to complete all or some of the steps of the method for generating checking data stated above. The memory 102 is configured for storing various types of data to support the operations in the electronic device 100. Those data may, for example, include instructions of any application programs or methods operating in the electronic device 100, and the data relevant to the application programs. The memory 102 may be embodied by using any type of volatile or non-volatile storage devices or combinations thereof, for example, one or more of a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The multimedia element 103 may comprise a screen and an audio element. The screen may, for example, be a touch screen. The audio element is configured for outputting and/or inputting an audio signal. For example, the audio element may comprise a microphone, and the microphone is configured for receiving an external audio signal. The received audio signal may be further stored in the memory 102 or be sent by the communication element 105. The audio element further comprises at least one loudspeaker configured for outputting the audio signal. The I/O interface 104 provides an interface between the processor 101 and other interface modules, wherein the other interface modules may be a keyboard, a mouse, a key and so on. Those keys may be virtual keys or tangible keys. The communication element 105 is configured for wired or wireless communication between the electronic device 100 and other devices. The wireless communication includes, for example, Wi-Fi, Bluetooth, Near-Field Communication (referred to for short as NFC), 2G, 3G or 4G, or a combination of one or more of them. Therefore, the corresponding communication element 105 may comprise a Wi-Fi component, a Bluetooth component and a NFC component.

The electronic device 100 may be embodied by one or more Application Specific Integrated Circuits (referred to for short as ASIC), Digital Signal Processors (referred to for short as DSP), Digital Signal Processing Devices (referred to for short as DSPD), Programmable Logic Devices (referred to for short as PLD), Field Programmable Gate Arrays (referred to for short as FPGA), controllers, microcontrollers, microprocessors or other electronic devices, to implement the method for generating checking data according to the above embodiments.

Figure 9:
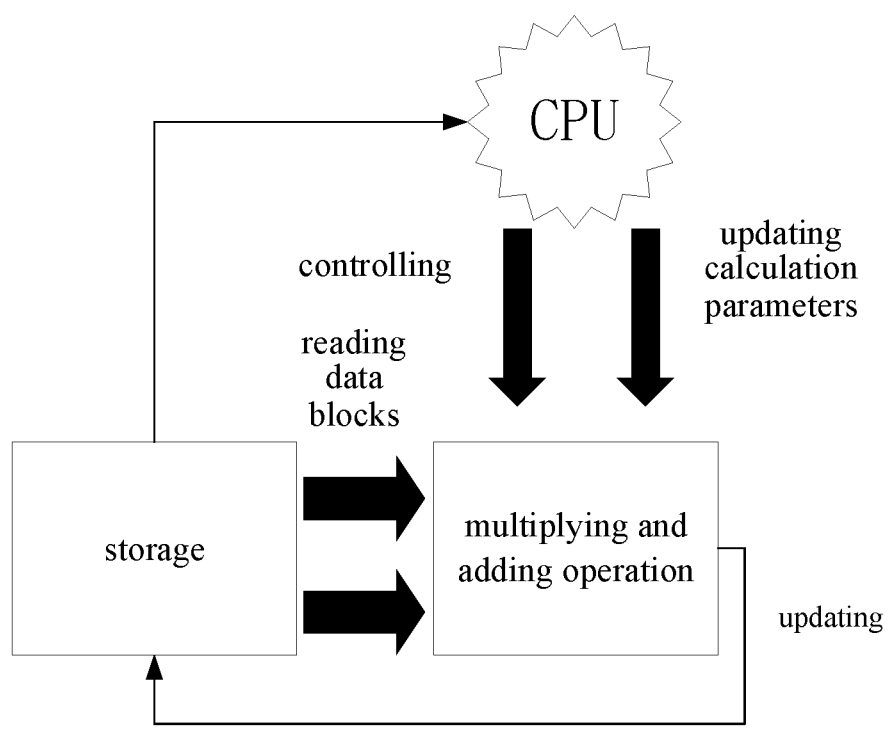
FIG. 9 is a schematic structural diagram of a data-recovery system according to an embodiment of the present application.

Referring to FIG. 9, FIG. 9 is a schematic structural diagram of a data-recovery system according to an embodiment of the present application. As shown in the figure, it comprises a CPU, a multiplying-and-adding-operation component and a storage system (i.e., the redundant array of independent disks). The redundant array of independent disks, when has an error, informs the error to the CPU. The CPU decides the control flow, controls the multiplying and adding module to read from the storage the data blocks that are correspondingly required to participate in the operation, subsequently calculates the required recovery parameters by the CPU or other hardware, and transmits the obtained parameters to the multiplying-and-adding-operation module. By multiplying and adding operations, the data blocks that are required to undergo exclusive-or operations to update the stored data are obtained, and are subsequently transmitted back to the storage for the updating, to complete the recovery of the data blocks.

A non-volatile computer-readable storage medium according to the embodiments of the present application will be described below, and the non-volatile computer-readable storage medium described below and the method for generating checking data described above may correspondingly refer to each other.

The present application further provides a non-volatile computer-readable storage medium, wherein the non-volatile computer-readable storage medium stores a computer program, and the computer program, when executed by a processor, implements the steps of the method for generating checking data stated above.

The non-volatile computer-readable storage medium may include various media that can store a program code, such as a USB flash disk, a mobile hard disk drive, a Read-Only Memory (ROM), a Random Access Memory (RAM), a diskette and an optical disk.

The embodiments of the description are described in the mode of progression, each of the embodiments emphatically describes the differences from the other embodiments, and the same or similar parts of the embodiments may refer to each other. Regarding the devices according to the embodiments, because they correspond to the methods according to the embodiments, they are described simply, and the relevant parts may refer to the description on the methods.

A person skilled in the art can further understand that the units and the algorithm steps of the examples described with reference to the embodiments disclosed herein may be implemented by using electronic hardware, computer software or a combination thereof. In order to clearly explain the interchangeability between the hardware and the software, the above description has described generally the configurations and the steps of the examples according to the functions. Whether those functions are executed by hardware or software depends on the particular applications and the design constraints of the technical solutions. A person skilled in the art may employ different methods to implement the described functions with respect to each of the particular applications, but the implementations should not be considered as extending beyond the scope of the present application.

The steps of the method or algorithm described with reference to the embodiments disclosed herein may be implemented directly by using hardware, a software module executed by a processor or a combination thereof. The software module may be embedded in a Random Access Memory (RAM), an internal memory, a read-only memory (ROM), an electrically programmable ROM, an electrically erasable programmable ROM, a register, a hard disk, a removable disk, a CD-ROM, or a storage medium in any other form well known in the art.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices.

The principle and the embodiments of the present application are described herein with reference to the particular examples, and the description of the above embodiments is merely intended to facilitate to comprehend the method according to the present application and its core concept. Moreover, for a person skilled in the art, according to the concept of the present application, the particular embodiments and the range of application may be varied. In conclusion, the contents of the description should not be understood as limiting the present application.

The invention claimed is:

1. A method for generating checking data comprising:
   acquiring a store-status matrix corresponding to a redundant array of independent disks, wherein the store-status matrix comprises a plurality of magnetic-disk vectors and a plurality of data vectors, and the magnetic-disk vectors and the data vectors are orthogonal;
   determining non-reference vectors among the magnetic-disk vectors, and performing data-vector-element evenly dividing processing to an initial data region formed by the non-reference vectors, to obtain a first data region and a second data region;
   performing data-exchange processing to the first data region and the second data region in the store-status matrix, to obtain a first matrix;
   determining a plurality of second-order matrixes in the first data region and the second data region of the first matrix, and performing position-exchange processing to target magnetic-disk elements in the second-order matrixes, to obtain a second matrix;
   performing single-error-correction encoding generating processing based on the second matrix, to obtain first checking data, and saving the first checking data into a first checking magnetic disk; and
   performing double-error-correction encoding generating processing based on the second matrix, to obtain second checking data, and saving the second checking data into a second checking magnetic disk,
   wherein the method further comprises:
   in response to that a failure of a target magnetic disk is detected, acquiring error-recovery data from non-target magnetic disks in the redundant array of independent disks;
   acquiring target first checking data from the first checking magnetic disk, and acquiring target second checking data from the second checking magnetic disk; and
   by using the error-recovery data, the target first checking data and the target second checking data, performing data recovery to the target magnetic disk.

2. The method for generating checking data according to claim 1, wherein the step of acquiring the store-status matrix corresponding to the redundant array of independent disks comprises:
   acquiring a magnetic-disk quantity, a magnetic-disk capacity and a stripe capacity of the redundant array of independent disks;
   determining a column quantity of the store-status matrix according to the magnetic-disk quantity, and determining a row quantity of the store-status matrix according to the magnetic-disk capacity and the stripe capacity, wherein the row quantity is an even number; and
   based on the column quantity and the row quantity, and a correspondence relation of data storage positions of magnetic disks, generating the store-status matrix.

3. The method for generating checking data according to claim 2, wherein the step of, based on the column quantity and the row quantity, and the correspondence relation of the data storage positions of the magnetic disks, generating the store-status matrix comprises:
   acquiring stripe-identifier data corresponding to data stripes in the magnetic disks;
   according to a relative position relation of the data stripes in the magnetic disks, generating the magnetic-disk vectors corresponding to the magnetic disks; and generating an initial matrix based on the column quantity and the row quantity, and filling the initial matrix with the magnetic-disk vectors, to obtain the store-status matrix.

4. The method for generating checking data according to claim 3, wherein before the step of, according to the relative position relation of the data stripes in the magnetic disks, generating the magnetic-disk vectors corresponding to the magnetic disks, the method further comprises:
   according to the stripe-identifier data, acquiring magnetic-disk serial numbers of the data stripes corresponding to the stripe-identifier data and serial numbers of the data stripes in the magnetic disks; and
   according to the magnetic-disk serial numbers of the data stripes and the serial numbers of the data stripes in the magnetic disks, determining the relative position relation of the data stripes in the magnetic disks.

5. The method for generating checking data according to claim 1, wherein the step of determining the plurality of second-order matrixes in the first data region and the second data region of the first matrix comprises:
   in response to the initial data region in the first matrix having the magnetic-disk vectors of an even-number quantity, by using two instances of the magnetic-disk vectors as a granularity, dividing the initial data region, to obtain a plurality of third data regions;
   in response to the initial data region in the first matrix having the magnetic-disk vectors of an odd-number quantity, determining one target magnetic-disk vector, and by using two instances of the magnetic-disk vectors as a granularity, grouping non-target magnetic-disk vectors, to obtain a plurality of third data regions;
   in response to the initial data region in the first matrix having the data vectors of an even-number quantity, by using two instances of the data vectors as a granularity, dividing the third data regions, to obtain the plurality of second-order matrixes;
   in response to the initial data region in the first matrix having the data vectors of an odd-number quantity, determining one target data vector, and by using two instances of the data vectors as a granularity, dividing non-target data vectors, to obtain the plurality of second-order matrixes.

6. The method for generating checking data according to claim 1, wherein the second matrix comprises a plurality of data vectors, and the data vectors include a current data vector; and
   the step of, performing single-error-correction encoding generating processing based on the second matrix, to obtain the first checking data comprises:
   reading a corresponding current data stripe from the redundant array of independent disks based on the current data vector, and performing exclusive-or processing to the current data stripe, to obtain the first checking data corresponding to the current data vector.

7. The method for generating checking data according to claim 1, wherein the second matrix comprises a plurality of data vectors, and the data vectors include a current data vector; and
   the step of, performing double-error-correction encoding generating processing based on the second matrix, to obtain the second checking data comprises:
   reading a corresponding current data stripe from the redundant array of independent disks based on the current data vector;
   acquiring a vector serial number corresponding to the current data vector, and by using the vector serial number, generating weight parameters corresponding to the current data stripe; and
   by using the weight parameters and the data stripes, obtaining weighted data, and performing exclusive-or processing to the weighted data, to obtain the second checking data corresponding to the current data vector.

8. The method for generating checking data according to claim 1, wherein the step of determining the non-reference vectors among the magnetic-disk vectors comprises:
   among the magnetic-disk vectors, determining a vector corresponding to any one instance of the magnetic disks to be a reference vector; and
   determining the other vectors than the reference vector among the magnetic-disk vectors to be the non-reference vectors.

9. The method for generating checking data according to claim 1, wherein the step of performing data-vector-element evenly dividing processing to the initial data region formed by the non-reference vectors, to obtain the first data region and the second data region comprises:
   determining the region where the non-reference vectors are located to be the initial data region;
   evenly dividing data-vector elements in the initial data region into two parts in a direction of the data vectors, to obtain two parts of the data-vector elements; and
   determining regions where the two parts of the data-vector elements are located to be the first data region and the second data region.

10. The method for generating checking data according to claim 1, wherein the step of performing data-exchange processing to the first data region and the second data region in the store-status matrix, to obtain the first matrix comprises:
    acquiring data-vector elements in the first data region and data-vector elements in the second data region; and
    exchanging positions in the store-status matrix of the data-vector elements in the first data region and the data-vector elements in the second data region, to obtain the first matrix.

11. The method for generating checking data according to claim 10, wherein after the data exchanging, the relative position relation of the data-vector elements in the first data region and the second data region does not change.

12. The method for generating checking data according to claim 1, wherein the step of performing position-exchange processing to the target magnetic-disk elements in the second-order matrixes, to obtain the second matrix comprises:
    determining any two elements that belong to a same instance of the magnetic-disk vectors in the second-order matrixes to be the target magnetic-disk elements; and
    exchanging positions of the target magnetic-disk elements in the second-order matrixes, to obtain the second matrix.

13. The method for generating checking data according to claim 1, wherein the first checking data and the second checking data correspond to different instances of the data vectors, and the first checking data or the second checking data correspond to the data vectors the same as the data vectors corresponding to the error-recovery data.

14. The method for generating checking data according to claim 1, wherein the step of, by using the error-recovery data, the target first checking data and the target second checking data, performing data recovery to the target magnetic disk comprises:
    in response to that a single instance of the magnetic disks has data missing, determining the error-recovery data, the first checking data and the second checking data that correspond to each of data blocks of the target magnetic disk; and according to the error-recovery data, the first checking data and the second checking data, performing data recovery to the corresponding data blocks in the target magnetic disk.

15. The method for generating checking data according to claim 1, wherein the step of, by using the error-recovery data, the target first checking data and the target second checking data, performing data recovery to the target magnetic disk comprises:

in response to that at least two instances of the magnetic disks have data missing, wiping data among the first checking data and the second checking data that are the same as the error-recovery data, to obtain remaining data;

according to a data relation between the remaining data, constructing a relation matrix;

performing calculation to the relation matrix, to obtain values of vectors of corresponding data blocks of the target magnetic disk; and according to the values of the vectors of the corresponding data blocks of the target magnetic disk, performing data recovery to the target magnetic disk.

16. An electronic device, wherein the electronic device comprises a memory and a processor;

the memory is configured to save a computer program; and the processor is configured to execute the computer program to implement the method for generating checking data according to claim 1.

17. The electronic device according to claim 16, wherein the step of acquiring the store-status matrix corresponding to the redundant array of independent disks comprises:

acquiring a magnetic-disk quantity, a magnetic-disk capacity and a stripe capacity of the redundant array of independent disks;

determining a column quantity of the store-status matrix according to the magnetic-disk quantity, and determining a row quantity of the store-status matrix according to the magnetic-disk capacity and the stripe capacity, wherein the row quantity is an even number; and based on the column quantity and the row quantity, and a correspondence relation of data storage positions of magnetic disks, generating the store-status matrix.

18. The electronic device according to claim 17, wherein the step of, based on the column quantity and the row quantity, and the correspondence relation of the data storage positions of the magnetic disks, generating the store-status matrix comprises:

acquiring stripe-identifier data corresponding to data stripes in the magnetic disks;

according to a relative position relation of the data stripes in the magnetic disks, generating the magnetic-disk vectors corresponding to the magnetic disks; and generating an initial matrix based on the column quantity and the row quantity, and filling the initial matrix with the magnetic-disk vectors, to obtain the store-status matrix.

19. A non-transitory computer-readable storage medium, wherein the non-volatile computer-readable storage medium is configured to save a computer program, and the computer program, when executed by a processor, implements the method for generating checking data according to claim 1.

* * * * *